United States Patent
Husmann

[11] 3,904,005
[45] Sept. 9, 1975

[54] OVERRUNNING CLUTCH

[75] Inventor: Horst Husmann, Wolfsburg, Germany

[73] Assignee: Volkswagenwerk Aktiengesellschaft, Wolfsburg, Germany

[22] Filed: Mar. 22, 1974

[21] Appl. No.: 453,576

[30] Foreign Application Priority Data
Apr. 6, 1973   Germany............................ 2317208

[52] U.S. Cl. ................................................. 192/45
[51] Int. Cl.² ...................... F16D 3/34; F16D 15/00
[58] Field of Search..................... 192/45; 188/82.84

[56] References Cited
UNITED STATES PATENTS

| | | | |
|---|---|---|---|
| 2,743,803 | 5/1956 | Ferris................................ | 192/45 X |
| 2,843,238 | 7/1958 | Rozner.............................. | 192/45 |
| 3,017,002 | 1/1962 | Marland............................ | 192/45 |
| 3,087,588 | 4/1963 | Fischer ............................. | 192/45 |
| 3,547,238 | 12/1970 | Harmon............................. | 192/45 |
| 3,732,956 | 5/1973 | Johnson et al..................... | 192/45 |
| 3,760,914 | 9/1973 | Gelbrich............................ | 192/45 |
| 3,799,306 | 3/1974 | Rist.................................... | 192/45 |

Primary Examiner—Samuel Scott
Assistant Examiner—Lance W. Chandler
Attorney, Agent, or Firm—Ernest F. Marmorek

[57]    ABSTRACT

An overrunning clutch of the type having a clamp roller with a first coupling portion which is provided with clamp ramps for the rollers and a second coupling part which forms a cylindrical running surface or journal and a cage which is provided with axially displaced lateral disks of annular shape between which the clamp rollers and associated compression springs are disposed. The construction is such that the clutch can be assembled even when both the two shafts or the like with which the clutch has to be connected are already fixed and in position. To this end the contour of the first disk facing the first coupling portion is essentially cylindrical while the corresponding contour of the second disk is provided with additional projections which support the first coupling part in recesses of the first coupling part after the cage has been assembled.

5 Claims, 8 Drawing Figures

3,904,005

1

OVERRUNNING CLUTCH

BACKGROUND OF THE INVENTION

This invention relates generally to clutches and particularly relates to an overrunning clutch which can be assembled with its cage even when the associated shafts are already fixed and in position.

Overrunning clutches provided with clamp rollers serve the purpose to interconnect two shafts or the like in a form-locking manner in one direction of rotation and to separate them from each other in the other direction of rotation. Known overrunning clutches of this type usually are provided with a symmetric cage and with lateral disks of equal shape, having contours facing the first coupling part which are provided with radially extending projections.

Usually the known overrunning clutches with clamp rollers are mounted in such a manner that initially the outer portion of the clutch is connected with the associated shaft or the like. Thereafter, the cage is pushed into the outer portion of the coupling and then the inner portion of the coupling is pushed into the cage or rotated. Finally, the inner portion of the clutch is connected with the associated shaft or the like. Frequently the assembly takes place in the opposite manner. In many cases the overrunning clutch must be assembled within a larger gear drive or the like or into a place which is not easily accessible. In those cases the previously described sequence of assembly cannot be carried out because the portion of the gear connected with the inner part of the coupling already has its position determined by its function. A reversal of the assembly sequence may also not be possible for the same reasons.

It is accordingly an object of the present invention to provide an overrunning clutch having clamp rollers which permits to install the cage of the clutch even where the associated shafts and the like are already positioned and rigidly connected with the outer part or portion of the coupling and the inner portion of the coupling in a simple manner.

SUMMARY OF THE INVENTION

In accordance with the present invention an overrunning clutch with clamp rollers is constructed in such a manner that the contour of the first disk facing the first clutch portion is substantially cylindrical while the corresponding contour of the second clutch is provided with additional projections which bear against recesses of the first clutch or coupling portion when the cage has been installed.

In view of the construction of the cage in accordance with the invention having two disks of different contour, it is possible in a simple manner to insert the cage even when the inner and outer portions of the coupling are already positioned without the necessity for special tools for the assembly.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
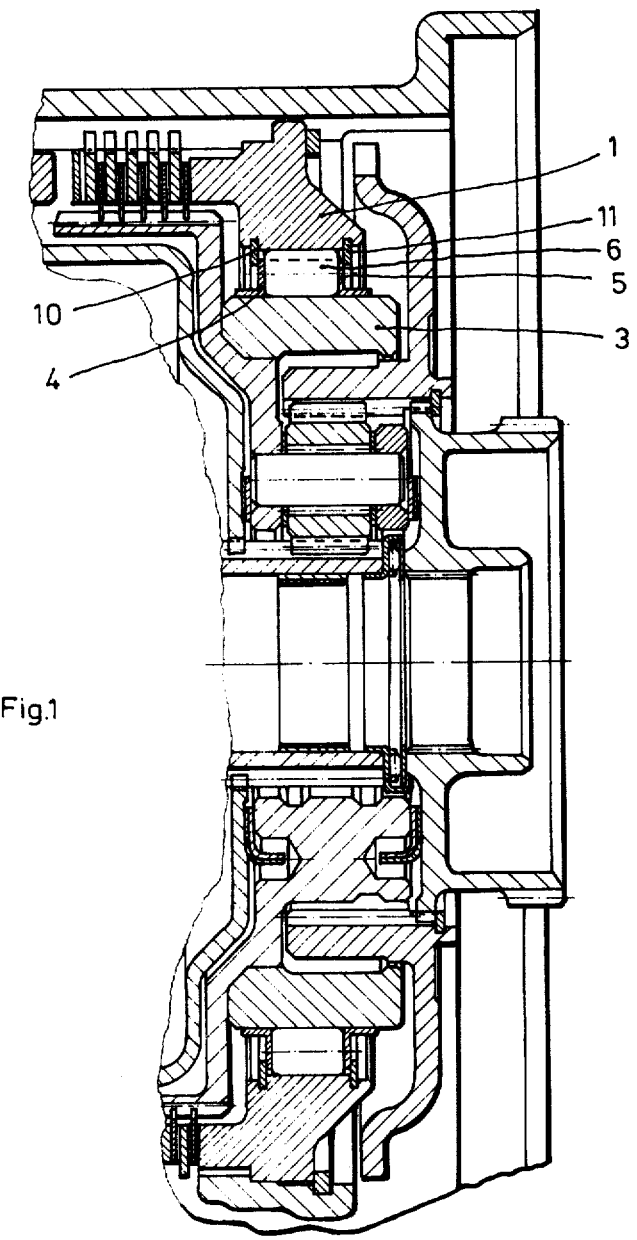
FIG. 1 is a cross-sectional view, parts being broken away, of a gear drive provided with the overrunning clutch with clamp rollers of the invention.

Referring now to the drawings and particularly to FIG. 1, there is shown a portion of a planetary gear and the inner portion 3 of the coupling rigidly connected with a portion of the gear by a press fit. The outer portion 1 of the coupling has an outer contour depending on the requirements of the planetary gear and therefore is provided with a number of projections and reliefs and serves the purpose to support the outer part of the overrunning clutch. Between the inner portion 3 and the outer portion 1 of the coupling there is provided a cage of the clutch having a first lateral disk 4 and a second lateral disk 5. The axial position of the cage is fixed by locking rings 10 and 11.

Figure 2:
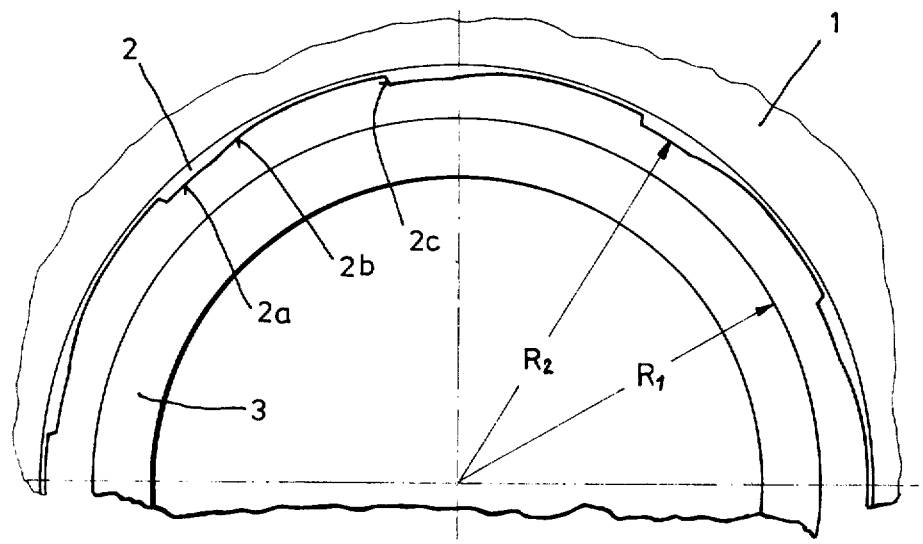
FIG. 2 is a schematic side elevational view of the outer and inner portions of the clutch.

FIG. 2 illustrates particularly the contours of the outer coupling portion 1 and the inner coupling portion 3. The outer contour of the inner portion 3 of the coupling is of cylindrical shape. It has a radius $R_1$ and serves as the running surface or journal for the clamp rollers of the cage. The outer portion 1 of the coupling serves the role to support the free running clutch toward the outside of the clutch. The inner contour thereof, however, is not cylindrical throughout as distinguished from the outer contour of the inner portion 3 of the coupling. It is provided with clamp ramps 2 which during the corresponding direction of rotation together with the clamp rollers perform a form-locking connection between the two coupling portions. In the embodiment illustrated in the drawing the clamp ramps serve several functions at the same time. They are provided with a ramp surface $2b$ which takes over the actual function of the clamp ramp, a cylindrical portion $2a$ which radially supports the cage and a shoulder $2c$ which serves as a bearing for the projections of the second disk of the cage. The cylindrical portion $2a$ of the clamp ramps 2 has a radius $R_2$.

Figure 3:
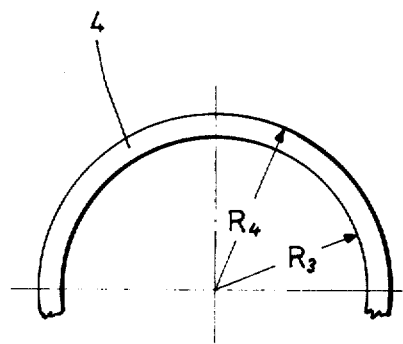
FIG. 3 is a side elevational view of the first disk of the cage.
Figure 4:
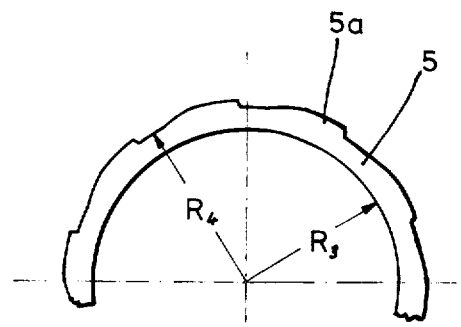
FIG. 4 is a side elevational view of the second disk of the cage.
Figure 5:
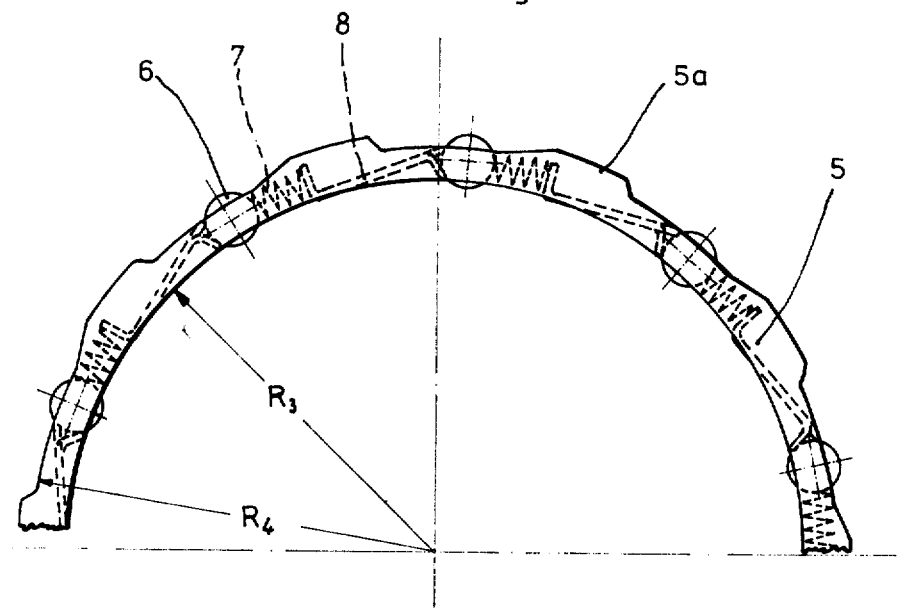
FIG. 5 is a side elevational view of the cage including the rollers and springs.

As illustrated particularly in FIGS. 3 – 5, the cage consists of two lateral disks of annular shape connected to each other by spacer angle bars 8, the lateral disks having different outer contours. FIG. 3 illustrates schematically the first lateral disk 4. It will be seen that it has a cylindrical outer contour which permits a twisting with respect to the outer portion of the coupling and has a radius $R_4$ which is somewhat smaller than the radius $R_2$ of the outer portion 1 of the coupling so that this disk may be inserted into the outer portion 1 of the coupling and then twisted. The inner radius $R_3$ of the disk 4 is correspondingly somewhat larger than the radius $R_1$ of the inner portion 3 of the coupling. Accordingly, the first disk may also move over the inner portion 3 of the coupling. The second lateral disk 5 is illustrated in FIG. 4. It has the same inner diameter $R_3$ as the first disk. Also, the outer contour of the disk corresponds in principle to the outer contour of the first disk 4. Additionally, however, it is provided with projections 5a which are used as supports. These projections 5a are so arranged that they bear against the shoulders 2c of the outer portion 1 of the coupling when the cage has been assembled. By means of these projections 5a the spring forces and the peripheral forces of the cage are supported at the outer portion 1 of the coupling for the roller bearing function.

FIG. 5 illustrates a schematic side view of the completed cage. The two lateral disks of which only the second disk 5 is visible in FIG. 5, are rigidly connected with each other by the spacer angle bars 8. The spacer angle bars 8 provide the exact positioning of the two disks 4 and 5. Between each two spacer angle bars 8 there is a clamping roller 6 and an associated compression spring 7. For this purpose one end of the spacer angle bar is so arranged that the clamp roller 6 has a certain guidance and cannot fall out in an upper or lower direction from the completed cage. The compression spring 7 may, for example, be mounted in a slit of the spacer angle bar 8. The distance between adjacent spacer angle bars 8 is such that the cage may be rotated toward the left over a certain distance when the clamp rollers 6 are maintained fixed because the compression spring 7 can be correspondingly compressed.

Figure 6:
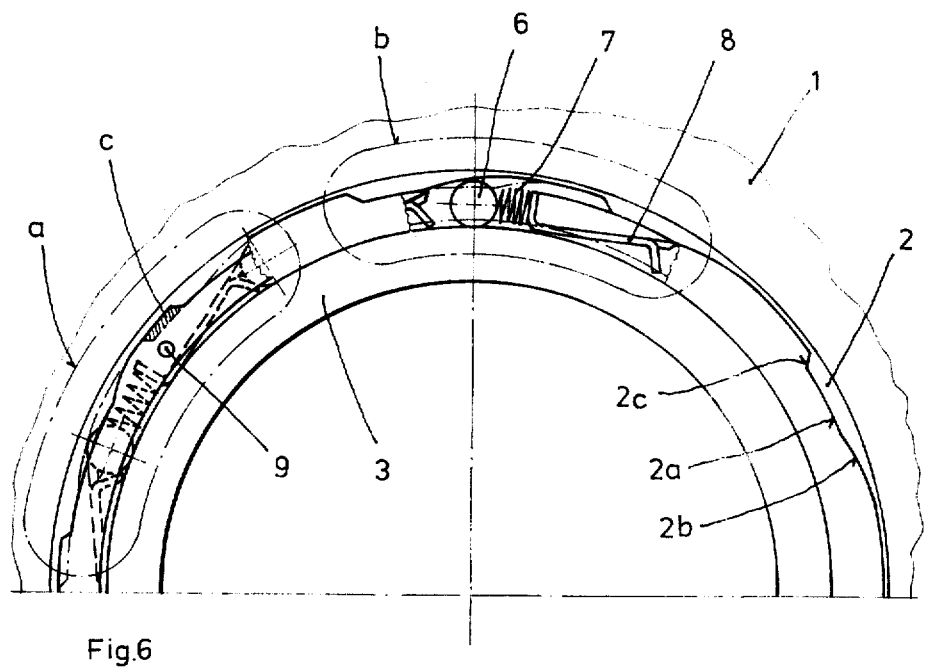
FIG. 6 is a schematic side elevational view of the position of the cage with its clamp rollers and springs while it is being inserted between the outer and inner coupling portions.

FIG. 6 illustrates the overrunning clutch with clamp rollers with the inner portion 3 and the outer portion 1 of the coupling as well as the cage during different periods of time while the cage is inserted into the clutch. In the left part of FIG. 3 there is illustrated within the dash-dot lines a the stage where the projection 5a of the second lateral disk 5 do not yet bear against a shoulder 2c of the outer portion 1 of the coupling. In the top portion of the figure there is illustrated within the dash-dot lines b the state where the projection 5a bears already against the shoulder 2c while the compression spring 7 is correspondingly compressed.

The overrunning clutch with clamp rollers is assembled in the following manner. It will be assumed that the inner portion 3 of the coupling is already rigidly connected with an associated construction part of the gear or the like and that the outer portion 1 of the coupling is already rigidly connected with its associated portion of the mechanism. Both portions of the coupling, therefore, are already in their final position determined by their function. The cage which is completed by the compression springs 7 and the clamp rollers 6 is now threaded by means of its first lateral disk 4 having a cylindrical outer contour over the inner portion 3 of the coupling. It is rotated with respect to the outer portion 1 of the coupling in such a manner that the cage with the clamp rollers 6 which extend over the central diameter $R_4$ of the lateral disks 4 and 5 may now be pushed into the outer portion 1 of the coupling. This is possible when the clamp roller 6 is disposed between the shoulder 2c of one clamp ramp and the ramp surface 2b of the adjacent clamp ramp. This position is illustrated in the portion a of FIG. 6. The entire cage can now be pushed in an axial direction so far into the coupling until the projections 5a of the second lateral disk 5 are disposed over the outer part 1 of the coupling. This has been shown by the shaded area c in the portion a of FIG. 6. By rotating the cage in the clamping direction the clamp rollers 6 are now brought against the ramp surfaces 2b of the clamp ramps 2. The cage is further rotated until the shaded area c no longer overlaps the projections 5a of the right-hand disk 5 with respect to the inner contour of the outer part 1 of the coupling. During this rotation the compression springs 7 are biased to the desired degree because of the blocked clamp rollers 6. In this position the cage can be pushed axially so far into the clutch until the first disk 4 is positioned adjacent the locking ring 10 of the outer part 1 of the coupling. The cage is now in the position where it can properly function. The projections 5a of the right-hand disk 5 bear against the shoulders 2c of the clamp ramps 2 of the outer portion 1 of the coupling. By means of a locking ring 11 in the outer portion of the coupling the cage is now axially fixed in this position.

During dismounting of the overrunning clutch the outer locking ring 11 is first removed and thereafter the complete cage is pulled out, for example, by means of two hooks which cooperate with two holes 9 of the cage which are displaced by 180°.

It is a particular advantage of the clutch of the invention that it is immaterial in which sequence the clutch is assembled regardless of the overall construction of the bearings, gears etc. It may be either preassembled and inserted as a complete building unit or else it may be assembled in the sequence inner portion, cage, outer portion or in the manner described hereinabove. Due to these properties the building space available can be utilized in an optimum manner because it is not necessary to consider a particular sequence of assembly.

Furthermore, no special tools are needed for the assembly so that the overrunning clutch is particularly favorable to rendering good service to customers.

Figure 7:
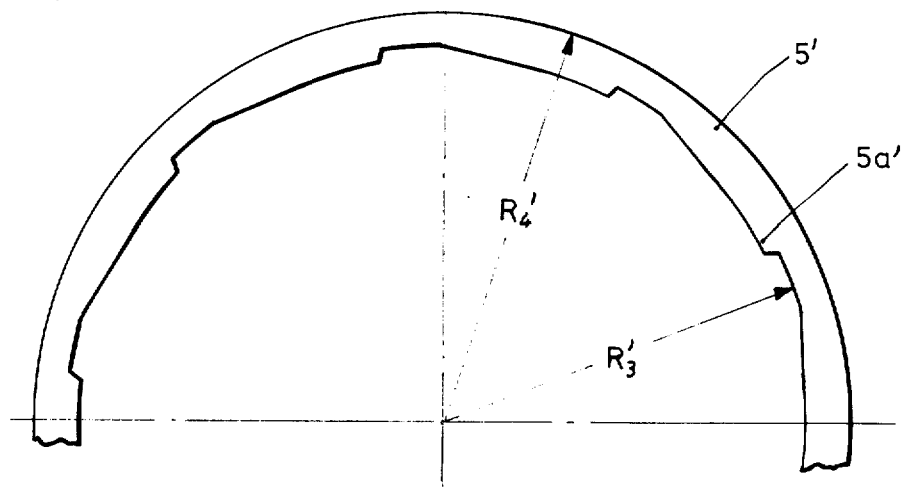
Figure 8:
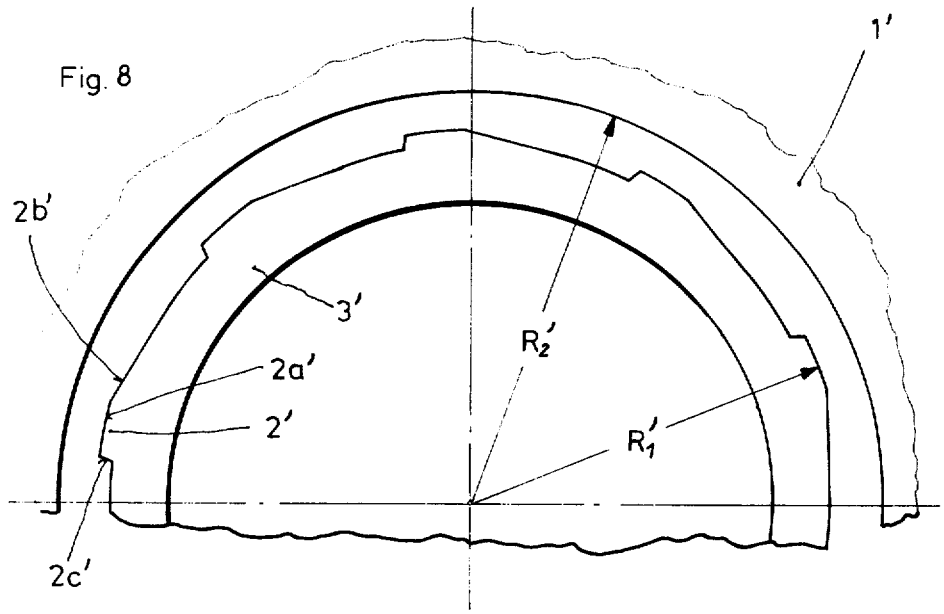

The invention has been explained by means of a clutch where the outer portion of the clutch is provided with ramps. A clutch of the type where the inner portion of the coupling is provided with ramps also falls within the spirit and scope of the present invention. FIGS. 7 and 8 show changes in construction of the coupling and cage appropriate for this further embodiment.

FIG. 7 is a rear view of FIG. 4 so as to show a disk with a cylindrical contour, the radius of which being smaller than the radius of the outer part of the coupling. The inner contour of the disk corresponds to the inner contour of the cylindrical disk.

FIG. 8 is a rear view of FIG. 2 so as to show the inner contour of the outer part as being cylindrical. The outer contour of the inner coupling part, in contrast, is not continuously cylindrical but has special clamping ramps.

FIG. 8 shows that the inner contour of the outer part 1' is formed cylindrically. It serves as tread for the clamping rolls of the cage. The outer contour of the inner part3' of the coupling, in contrast to the inner contour of the outer part 1' of the coupling, is not continuously cylindrical. It has, however, clamping ramps 2' which effect a mating connection between the two coupling parts, at suitable rotational directions of the two coupling parts in cooperation with the clamping rolls (not shown) of the cage. In the instant modification, the clamping ramps 2' serve several functions simultaneously. They have a running-on surface 2b' which assumes the clamping ramp function proper, a cylindrically extending part 2a' serving for the radial support of the cage, and a shoulder $2c'$ serving as support for projections of the cage's second disk.

The inner contour of the outer part $1'$ of the coupling has a radius $R_2'$ and the cylindrical part $2a'$ of the clamping ramp $2'$ of the inner part $3'$ of the coupling has a radius $R_1'$. For the sake of clarity, the cage with the distance angles, the clamping rolls, the pressure springs and the sideward disks was not shown in FIG. 8. However, the structure of the cage corresponds essentially to the one shown in FIG. 5. Essentially, only the second sideward disk is formed differently. The first sideward disk corresponds to the disk 4 shown in FIG. 3. The second sideward disk has the form shown in FIG. 7. Deviating from the disk described above in FIG. 4, this second sideward disk $5'$ has a cylindrical outer contour with a radius $R_4'$. The latter is somewhat smaller than the inner radius $R_2'$ of the outer part $1'$ of the coupling. The inner contour of this disk has a cylindrical base contour with the radius $R_3'$, which is somewhat larger than the radius $R_1'$ of the inner part $3'$ of the coupling assigned to it. In addition, it has projections $5a'$ which serve as support areas. They are so constructed that they abut against the shoulders $2c'$ of the inner part $3'$ of the coupling, in a cage built into the coupling. By these projections $5a$, the spring forces and the peripheral forces from the friction bearing function of the cage abut against the inner part $3'$ of the coupling.

What is claimed is:

1. An overrunning clutch, comprising in combination, a plurality of circumferentially spaced clamp rollers;

an outer coupling element and an inner coupling element, one of said coupling elements being provided with clamp ramps for said clamp rollers, the other of said coupling elements forming a cylindrical running surface for said clamp rollers;

a cage arranged between said outer and said inner coupling elements and including a pair of lateral disks of annular shape and which are axially spaced with respect to each other with said clamp rollers located therebetween; and a plurality of expansion springs each located between said disks and intermediate two circumferentially spaced ones of said clamp rollers, the contour of a first one of said disks facing said one coupling element being of substantially cylindrical shape and the other disk having a corresponding contour but being provided with projections extending beyond its contour, said one coupling element having recesses and said projections of said other disk bearing against said recesses when said cage is assembled and arranged between said outer and inner coupling elements.

2. Clutch as defined in claim 1, wherein said outer coupling element is provided with said clamp ramps and said inner coupling element forms said cylindrical running surface.

3. Clutch as defined in claim 1, wherein said inner coupling element is provided with said clamp ramps and said outer coupling element forms said cylindrical running surface.

4. Clutch as defined in claim 1, wherein said clamp ramps are each provided with a cylindrical portion which radially supports said disks of said cage.

5. Clutch as defined in claim 4, wherein said cylindrical portion of said clamp ramps has a steeply falling portion to provide shoulders which serve as bearing for the projections of said other disk when said cage is assembled.

* * * * *